(12) United States Patent
Uhler

(10) Patent No.: US 9,712,956 B2
(45) Date of Patent: Jul. 18, 2017

(54) SYSTEM AND METHOD TO DETERMINE A LOCATION ASSOCIATED WITH AN INTERNET PHONE

(75) Inventor: Stephen Alan Uhler, Los Altos, CA (US)

(73) Assignee: Oracle America, Inc., Redwood City, CA (US)

( * ) Notice: Subject to any disclaimer, the term of this patent is extended or adjusted under 35 U.S.C. 154(b) by 2085 days.

(21) Appl. No.: 12/042,586

(22) Filed: Mar. 5, 2008

(65) Prior Publication Data

US 2009/0086721 A1  Apr. 2, 2009

Related U.S. Application Data

(60) Provisional application No. 60/975,994, filed on Sep. 28, 2007.

(51) Int. Cl.
| | |
|---|---|
| H04W 4/02 | (2009.01) |
| H04M 7/00 | (2006.01) |
| H04L 29/12 | (2006.01) |
| H04M 3/42 | (2006.01) |
| H04L 29/08 | (2006.01) |

(52) U.S. Cl.
CPC ............. *H04W 4/02* (2013.01); *H04L 61/106* (2013.01); *H04M 7/006* (2013.01); *H04L 29/1216* (2013.01); *H04L 29/12839* (2013.01); *H04L 61/157* (2013.01); *H04L 61/6022* (2013.01); *H04L 67/18* (2013.01); *H04M 3/42314* (2013.01); *H04M 2242/30* (2013.01)

(58) Field of Classification Search
CPC ........... H04L 29/1216; H04L 29/12839; H04L 61/106; H04L 61/157; H04L 61/6022; H04L 67/18; H04M 2242/30; H04M 3/42314; H04M 7/006; H04W 4/02
USPC ................................ 455/456.1; 370/352–356
See application file for complete search history.

(56) References Cited

U.S. PATENT DOCUMENTS

| | | | |
|---|---|---|---|
| 2005/0180429 A1* | 8/2005 | Ghahremani et al. | ... 370/395.21 |
| 2006/0120517 A1* | 6/2006 | Moon et al. | ..................... 379/45 |

* cited by examiner

*Primary Examiner* — Khaled Kassim
(74) *Attorney, Agent, or Firm* — Brooks Kushman P.C.

(57) ABSTRACT

An Internet phone may be physically located based on its credential. The credential is related to a MAC address of the Internet phone. The MAC address is related to a port identifier of a network switch in communication with the Internet phone. The port identifier is related to a physical location of the Internet phone.

15 Claims, 2 Drawing Sheets

SYSTEM AND METHOD TO DETERMINE A LOCATION ASSOCIATED WITH AN INTERNET PHONE

CROSS-REFERENCE TO RELATED APPLICATIONS

This application claims the benefit of U.S. provisional application Ser. No. 60/975,994 filed Sep. 28, 2007.

BACKGROUND

1. Field of the Invention

The invention relates to systems and methods to determine a location associated with an Internet phone.

2. Discussion

Internet telephones provide voice communications and services using IP networks. Current Internet telephones use IP-addressed telephone numbers. These telephone numbers do not indicate the physical location of the Internet telephones associated with them. Internet telephones cannot be physically located based on their telephone numbers.

SUMMARY

Embodiments of the invention may take the form a system for determining a physical location associated with an Internet phone. The system includes several modules in communication with each other. A first module has a port identifier and receives a phone identifier and a network identifier from the Internet phone. A second module receives the phone identifier from the first module. A third module stores a mapping of the phone identifier with the network identifier, a mapping of the port identifier with the network identifier, and a mapping of the port identifier with a physical location associated with the Internet phone.

Embodiments of the invention may take the form of a method for determining a physical location associated with an Internet phone. The internet phone has a network identifier and a phone identifier. The internet phone is in communication with a network switch. The network switch includes a port having a port identifier. The network is in communication with a phone processing system configured to handle a phone call from the Internet phone upon receiving the phone identifier. The method includes mapping the phone identifier with the network identifier, mapping the port identifier with the physical location associated with the Internet phone, and mapping the port identifier with the network identifier. The method further comprises receiving the phone identifier at the phone processing system when a call is placed from the phone and accessing the mappings to determine the physical location associated with the Internet phone based on the phone identifier.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

An Internet capable protocol Private Branch Exchange (IP PBX) may be combined with a network switch. Network sockets at various locations are connected to known ports on the network switch. The physical location of each switch is recorded in a database. The database may be co-located with the network switch. For example, the database and network switch may reside in a common hardware unit. The database may also be remotely located from the network switch. For example, the database and network switch may be located on different floors of the same building.

An Internet phone connected to a known port of the network switch connects to the IP PBX using the credentials of the Internet phone. The credentials of the Internet phone may include a phone number, user id, or password. The physical location of the Internet phone, as identified by the port number of the switch it is connected with, may be combined with the credentials of the Internet phone, which is known to the IP PBX via the database. This information is thus used to identify the physical location associated with the Internet phone.

Figure 1:
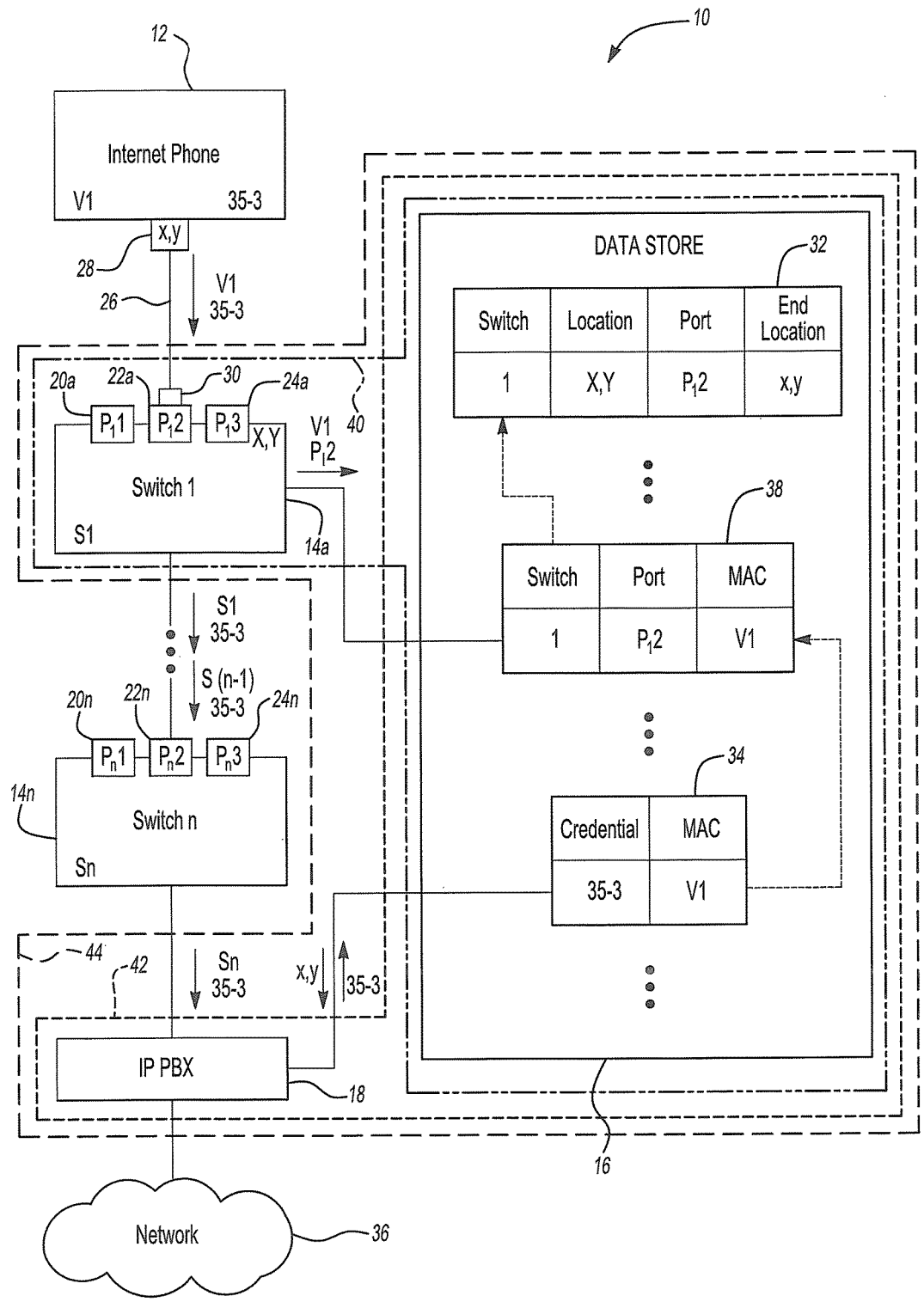
FIG. 1 is a block diagram of an example system for identifying the location of an Internet phone.

FIG. 1 is a block diagram of a system 10 for identifying the location of an Internet phone 12. The Internet phone 12 may be any appropriate endpoint capable of communicating via the Internet. The Internet phone 12 may include software that permits it to send and receive calls using protocols such as H.323, Session Initiation Protocol (SIP), or Media Gateway Control Protocol (MGCP). In the example of FIG. 1, the Internet phone 12 has a MAC address of V1 and a credential of 35-3.

The system 10 of FIG. 1 includes a network switch 14a, database 16, and IP PBX 18. In the example of FIG. 1, the network switch 14a is an ethernet network switch. In other examples, the network switch may be any appropriate circuitry capable of selecting a path to send voice to its destination.

The network switch 14a includes ports 20a, 22a, 24a, e.g., $P_1 1$, $P_1 2$, $P_1 3$ respectively. The network switch 14a has a MAC address of S1 and is located at point X, Y. In the examples herein, physical locations are described using Cartesian style coordinates. The selection of this notation is meant to facilitate description and not intended to be limiting. Any suitable technique may be used for identifying physical locations.

The network switch 14a communicates with the Internet phone 12 via a communication line 26. In one example, the communication line 26 is a wireless communication link. In other examples, the communication line 26 is a hard wired communication link. The communication line 26 has two endpoints 28, 30. The endpoint 28 is in communication with the Internet phone 12 and is located at point x, y. The endpoint 30 is in communication with the port 22a.

Network switch 14n includes ports 20n, 22n, 24n, e.g., $P_1 1$, $P_1 2$, $P_1 3$ respectively. The network switch 14n has a MAC address of Sn. In the Example of FIG. 1, the network switch 14n is the last of several network switches in a chain leading to the IP PBX 18. In other examples, however, there may be only one network switch between the Internet phone 12 and the IP PBX 18. For example, the network switch 14a may be the only network switch between the Internet phone 12 and the IP PBX 18.

The network switches 14b-14n are configured similarly to the network switch 14a. The network switches 14b-14n, however, are not in communication with the database 16. In other examples, some or all of the network switches 14b-14n may be in communication with the database 16 and/or other Internet phones.

The database 16 holds, inter alia, data concerning the Internet phone 12, network switch 14a, and endpoint 28 of the communication line 26. The database 16 stores data 32 relating the network switch 14*a* to its location and the port 22*a* to the location of the endpoint 28. This data may be loaded manually. This data may also be communicated from the network switch 14*a* to the database 16 using standard techniques. For example, the network switch 14*a* may communicate with the database 16 using the Simple Network Management Protocol (SNMP). The database 16 may also store such information regarding the ports 20*a*, 24*a*. For example, port 20*a* may communicate with another internet phone (not shown) connected with an endpoint (not shown) located at point x', y'. The data for such a configuration would include Switch: 1; Location: X,Y; Port $P_1$1; and End Location x', y'. In other examples, similar data may also be stored for other network switches. As such, database 16 may support a number of internet phones and network switches.

The database 16 also stores data 34 relating the credential of the Internet phone 12 to its MAC address. This data may be loaded manually. The MAC address may also be communicated from the Internet phone 12 to the database 16 via the switch 14*a* using standard techniques. For example, the MAC address may be communicated from the Internet phone 12 to the database 16 via the switch 14*a* using SNMP. The database 16 may also store such information for other Internet phones (not shown).

The IP PBX 18 communicates with the Internet phone 12 via the network switches 14*a*-14*n*. The IP PBX 18 is a gateway between the Internet phone 12 and network 36. The network 36 may be any type of communication network. For example, the network 36 may be a packet switched network. The network 36 may also be a circuit switched network.

In the example of FIG. 1, when a call is placed from the Internet phone 12, its MAC address and credential are sent to the network switch 14*a* via the communication line 26. In other words, V1 and 35-3 are sent to the network switch 14*a*. The network switch 14*a* receives this information at the port 22*a*.

The network switch 14*a* sends the MAC address information of the Internet phone 12 and the port at which the information was received to the database 16. In other words, V1 and $P_1$2 are sent to the database 16. The database 16 stores this information as data 38.

The network switch 14*a* sends the credential of the Internet phone 12 and the MAC address of the network switch 14*a* to the network switch 14*b* (not shown). In other words, 35-3 and S1 are sent to the network switch 14*b*. The network switch 14*b* (not shown) receives this information at the port 22*b* (not shown).

The network switch 14*b* sends the credential of the Internet phone 12 and the MAC address of the network switch 14*b* to the next network switch in the chain for eventual delivery to the IP PBX 18. The IP PBX 18 receives the credential of the Internet phone 12 and the MAC address of the network switch 14*n*. In other words, 35-3 and Sn are received by the IP PBX 18. The MAC address information of the Internet Phone 12 does not reach the IP PBX 18.

To determine a location associated with the Internet phone 12, the IP PBX 18 sends the credential of the Internet phone 12 to the database 16. The database 16 translates the credential of the Internet phone 12 to the location of the endpoint 28 associated with the Internet phone 12. The database 16 then sends this location information to the IP PBX 18. The IP PBX 18 may then communicate the location associated with the Internet phone 12 to the network 36.

In the example of FIG. 1, the IP PBX sends 35-3 (the credential of the Internet phone) to the database 16. The database 16 translates 35-3 (the credential of the Internet phone) to V1 (the MAC address associated with the Internet phone 12) through the use of the data 34. The database 16 then translates V1 (the MAC address associated with the Internet phone 12) to $P_1$2 (the port in communication with the Internet phone 12). In examples where the database 16 stores information for multiple switches, the database 16 may also translate V1 (the MAC address associated with the Internet phone 12) to 1 (the identifier for the network switch 14*a* which includes the port identified as $P_1$2) to facilitate the identification of the correct network switch and port. The database next translates $P_1$2 (the port in communication with the Internet phone 12) to either or both of X, Y (the location of the network switch 14*a*) and x, y (the location of the endpoint 28 connected with the Internet phone 12). The database 16 sends either or both of X, Y (the location of the network switch 14*a*) and x, y (the location of the endpoint 28 connected with the Internet phone 12) to the IP PBX 18.

In the example of FIG. 1, the network switch 14*a*, database 16, and IP PBX 18 are located remote from one another. For example, the network switch 14*a* and the database 16 are located in different buildings on the same corporate campus. The IP PBX 18 is located outside the corporate campus. In some examples, the network switch 14*a* and database 16 may be located in a common unit 40. Such co-location may facilitate ease of administration and system management. In other examples, the database 16 and IP PBX 18 may be located in a common unit 42. In still other examples, the network switch 14*a*, database 16, and IP PBX 18 may be located in a common unit 44.

In the example of FIG. 1, the database 16 is located within a single module. In other examples, portions of the data 32, 34, 38 may reside with the network switch 14*a* and/or the IP PBX 18. For example, the data 32 may reside with the network switch 14*a* and data 34, 38 may reside with the IP PBX 18. In such circumstances, standard techniques may be used to communicate the translation information between the network switch 14*a* and the IP PBX 18. Other configurations are also possible.

Figure 2:
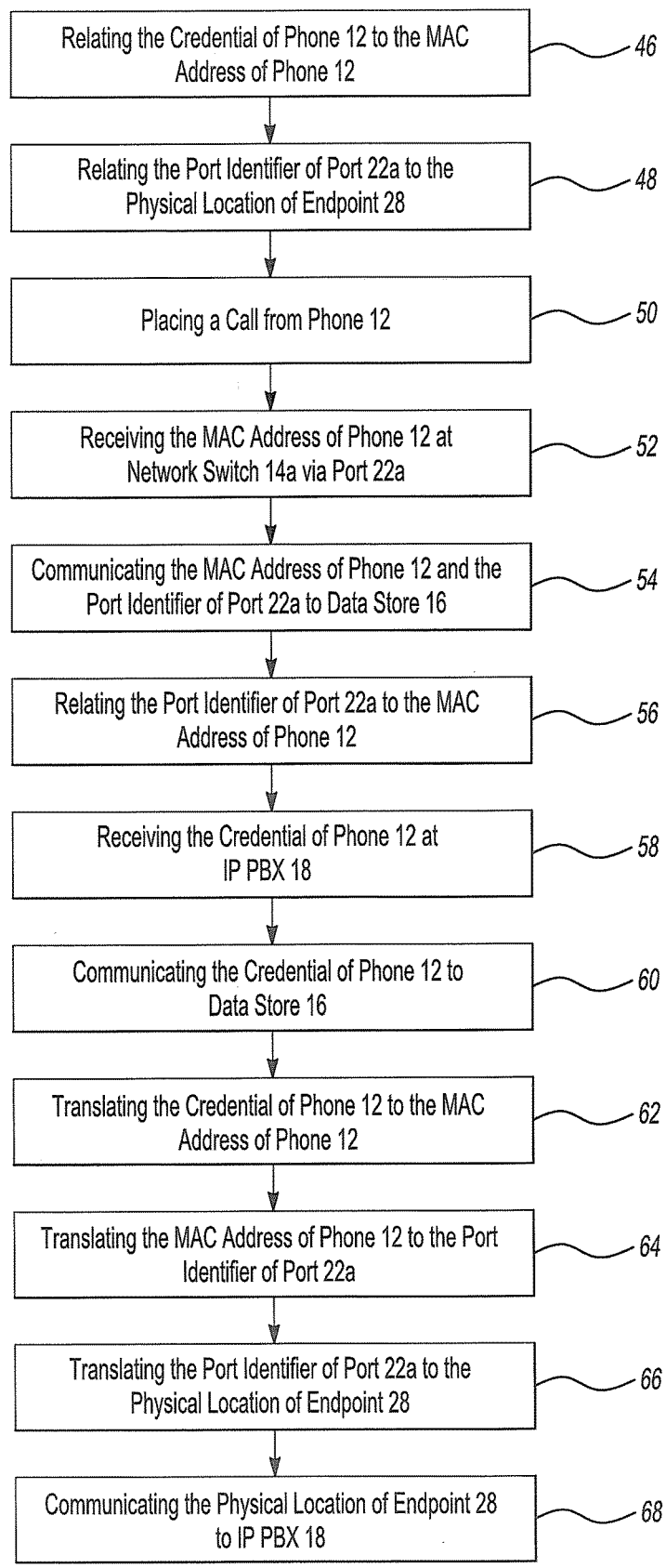
FIG. 2 is a flow chart of a method for identifying the location of an Internet phone.

FIG. 2 is a flow chart of a method for identifying the location of an Internet phone. The description of FIG. 2 references the example of FIG. 1 for the purposes of illustration. Such references, however, are not meant to be limiting. The method described with reference to FIG. 2 may be applied to any suitably configured system for determining the location associated with an Internet phone.

At 46, the credential of the Internet phone 12 is related to the MAC address of the Internet phone 12. At 48, the port identifier of the port 22*a* is related to the physical location of the endpoint 28.

At 50, a call is placed from the Internet phone 12 to another phone connected with the network 36. At 52, the MAC address of the Internet phone 12 is received at the network switch 14*a* via the port 22*a*. At 54, the MAC address of the Internet phone 12 and the port identifier of the port 22*a* are communicated to the data store 16. At 56, the port identifier of the port 22*a* is related to the MAC address of the Internet phone 12.

At 58, the credential of the Internet phone 12 is received at the IP PBX 18. At 60, the credential of the Internet phone 12 is communicated to the data store 16. At 62, the credential of the Internet phone 12 is translated to the MAC address of the Internet phone 12. At 64, the MAC address of the Internet phone 12 is translated to the port identifier of the port 22*a*. At 66, the port identifier of the port 22*a* is translated to the physical location of the endpoint 28. At 68, the physical location of the endpoint 28 is communicated to the IP PBX 18.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for determining a physical location associated with an Internet phone having a network identifier and a phone identifier, the system comprising:
   a first module including a port having a port identifier and configured to receive the phone identifier and network identifier via the port;
   a second module configured to receive the phone identifier; and
   a third module configured to store a mapping of the phone identifier with the network identifier, a mapping of the port identifier with the network identifier, and a mapping of the port identifier with the physical location associated with the Internet phone to permit the determination of the physical location associated with the Internet phone based on the phone identifier, wherein the first module is further configured to, in response to receiving via the port the phone identifier and network identifier without the port identifier, detect the port identifier associated with the port and communicate the network identifier and port identifier to the third module to update the mappings.

2. The system of claim 1 wherein at least one of the first module, the second module and the third module is further configured to determine the location associated with the Internet phone based on the phone identifier.

3. The system of claim 1 wherein the second module is further configured to communicate the phone identifier to the third module.

4. The system of claim 3 wherein the third module is further configured to communicate the physical location associated with the Internet phone to the second module.

5. The system of claim 1 wherein the first module comprises a network switch, the second module comprises a phone processing system and the third module comprises a database.

6. The system of claim 1 wherein the first module and the second module reside within a common fourth module.

7. The system of claim 1 wherein the second module and the third module reside within a common fourth module.

8. The system of claim 1 wherein the first module, the second module, and the third module reside within a common fourth module.

9. The system of claim 1 wherein the network identifier comprises a MAC address.

10. The system of claim 1 wherein the phone identifier comprises a credential.

11. A system for determining a physical location associated with an Internet phone having a credential and a MAC address, the system comprising:
    a network switch including a port having a port identifier in communication with the Internet phone such that it receives the credential and the MAC address via the port;
    a phone processing system in communication with the network switch such that it receives the credential; and
    a database in communication with the network switch and the phone processing system, the database being configured to store a mapping of the credential with the MAC address, a mapping of the port identifier with the MAC address, and a mapping of the port identifier with the physical location associated with the Internet phone to permit the determination of the physical location associated with the Internet phone based on the credential, wherein the network switch is configured to, in response to receiving via the port the credential and MAC address without the port identifier, detect the port identifier associated with the port and communicate the MAC address and port identifier to the database to update the mappings.

12. The system of claim 11 wherein at least one of the network switch, the phone processing system and the database are configured to determine the location associated with the Internet phone based on the credential.

13. The system of claim 11 wherein the phone processing system is configured to communicate the credential to the database.

14. The system of claim 11 wherein the network switch and the database reside within a common module.

15. The system of claim 11 wherein the phone processing system and the database reside within a common module.

* * * * *

UNITED STATES PATENT AND TRADEMARK OFFICE
CERTIFICATE OF CORRECTION

PATENT NO. : 9,712,956 B2
APPLICATION NO. : 12/042586
DATED : July 18, 2017
INVENTOR(S) : Uhler Page 1 of 1

It is certified that error appears in the above-identified patent and that said Letters Patent is hereby corrected as shown below:

In the Drawings

On sheet 1 of 2, in Fig. 1, before Reference Numeral 40, Line 9, delete "$P_12$" and insert -- $P_12$ --, therefor.

In the Specification

In Column 3, Line 12, delete "X,Y;" and insert -- X, Y; --, therefor.

Signed and Sealed this
Thirteenth Day of February, 2018

Andrei Iancu
*Director of the United States Patent and Trademark Office*